United States Patent
Martin et al.

(10) Patent No.: US 7,828,369 B2
(45) Date of Patent: Nov. 9, 2010

(54) INTERMEDIATE FRONT FENDER SUPPORT ELEMENT FOR A MOTOR VEHICLE AND PRODUCTION METHOD THEREOF

(75) Inventors: Laurent Martin, Peaugres (FR); Marcel Boksebeld, Peage de Rousillon (FR); Olivier Glaumot, Chevreuse (FR); Yvon Tetu, La Garenne Colombes (FR)

(73) Assignees: Inoplast, Annonay (FR); Renault SAS, Boulogne Billancourt (FR)

( * ) Notice: Subject to any disclaimer, the term of this patent is extended or adjusted under 35 U.S.C. 154(b) by 696 days.

(21) Appl. No.: 10/590,057

(22) PCT Filed: Feb. 23, 2005

(86) PCT No.: PCT/FR2005/000429

§ 371 (c)(1),
(2), (4) Date: Dec. 14, 2006

(87) PCT Pub. No.: WO2005/090147

PCT Pub. Date: Sep. 29, 2005

(65) Prior Publication Data

US 2008/0296932 A1    Dec. 4, 2008

(30) Foreign Application Priority Data

Feb. 24, 2004    (FR) ................................. 04 01837

(51) Int. Cl.
*B62D 29/04* (2006.01)
(52) U.S. Cl. ............................. 296/187.03; 296/187.04
(58) Field of Classification Search ............ 296/187.01, 296/187.03, 187.09, 187.12, 193.09, 198, 296/203.02, 203.03
See application file for complete search history.

(56) References Cited

U.S. PATENT DOCUMENTS

| | | | |
|---|---|---|---|
| 6,371,540 B1 * | 4/2002 | Campanella et al. | 293/102 |
| 6,435,577 B1 * | 8/2002 | Renault | 293/120 |
| 6,612,644 B2 * | 9/2003 | Ahn | 296/187.04 |
| 6,688,661 B2 * | 2/2004 | Yamamoto | 293/102 |
| 6,736,434 B2 * | 5/2004 | Anderson et al. | 293/102 |
| 7,192,080 B2 * | 3/2007 | Marijnissen et al. | 296/198 |
| 7,204,545 B2 * | 4/2007 | Roux et al. | 296/187.09 |
| 7,210,732 B2 * | 5/2007 | Marijnisse et al. | 296/198 |

(Continued)

FOREIGN PATENT DOCUMENTS

EP    0 443 767 A1    8/1991

(Continued)

*Primary Examiner*—Patricia L Engle
*Assistant Examiner*—SunSurraye Westbrook
(74) *Attorney, Agent, or Firm*—Oliff & Berridge, PLC

(57) ABSTRACT

The invention relates to a support element (4) which can be mounted to an upper beam of the chassis of a motor vehicle. The inventive element comprises a body (6) and at least one upwardly-projecting breakable protuberance (7A, 7B) to which a front fender of the vehicle is to be fixed. The protuberance (7A, 7B) comprises: at least one front wall (28) which is connected to the body (6) by means of a frangible area (26), a rear wall which is also connected to the body (6) by means of the frangible area (26), and a third wall (29) which is connected to the body (6) by the frangible area (26) and which solidly connects the front wall (28) and the rear wall to one another.

13 Claims, 8 Drawing Sheets

U.S. PATENT DOCUMENTS

2004/0104599 A1* 6/2004 Svendsen et al. ....... 296/187.09
2004/0108753 A1* 6/2004 Bruderick et al. ...... 296/203.02

FOREIGN PATENT DOCUMENTS

| | | | |
|---|---|---|---|
| FR | 2 270 086 A | | 1/1976 |
| FR | 2863231 A1 | * | 6/2005 |
| GB | 2 362 615 A | | 11/2001 |
| JP | 2001-334958 A | | 12/2001 |
| WO | WO 2006120908 A1 | * | 11/2006 |

* cited by examiner

INTERMEDIATE FRONT FENDER SUPPORT ELEMENT FOR A MOTOR VEHICLE AND PRODUCTION METHOD THEREOF

The present invention relates to an intermediate front fender support element for a motor vehicle, as well as a method for molding such an intermediate support element.

Currently, the front fenders of motor vehicles are generally fixed directly to the upper beams of the chassis of these vehicles. When such is the case, a disadvantage of current motor vehicles is that nothing is provided to dampen an impact between a person and a front fender of these vehicles.

In GB-A-2 362 615, an element is described for fixing a fender, mudguard or hood of a vehicle onto the chassis of a vehicle. This fixing element comprises several successive portions, which are substantially identical. An attachment base and a front rising wall provided with an upper edge are common to these various portions, each of which includes means for securing the element to be fixed, as well as a front oblique wall extended upward by the rising wall and being connected at the bottom to the attachment base by a front hinge. Rear vertical pillars or ribs are positioned either side of each of the successive portions. Each of these is only connected to the base by one side, and more precisely to a zone of least strength. Each pillar is also connected to the rising wall that it therefore connects to the base. When the vehicle collides with an obstacle, the zones of least strength give and the inclined walls, as well as the rising wall, tilt backward about the hinges. GB-A-2 362 615 provides a solution not to the problem of damping downward impacts applied to the top of the hood or of the front fender of the vehicle, but to the problem of damping shocks directed rearward. Now, when a motor vehicle progressing normally forward strikes the region of the legs of a pedestrian, the head of the latter quite often strikes the top of the hood or of one of the front fenders of this vehicle.

In addition, it appears difficult for the solution provided in GB-A-2 362 615 to be able to satisfy certain requirements as regards performance in the case of the application of a static force, which could for example result from supporting a person seated on the vehicle. Among these requirements, one in particular is that the fixing element should not deform too much, and also give less, if such a static force is applied to the element attached thereby.

The object of the invention is at least to reduce the number and severity of injuries following accidents between a pedestrian and a motor vehicle.

To this end, the subject of the invention is an intermediate support element for a front fender of a motor vehicle, this support element being able to be mounted on an upper beam of the chassis of the motor vehicle and comprising a body and at least one breakable protuberance projecting upward and to which said front fender is intended to be fixed, said protuberance comprising at least one front wall connected by a frangible zone to said body, a rear wall connected by the frangible zone to said body and a third wall which the frangible zone connects to said body and which rigidly connects the front wall and the rear wall to each other.

According to other advantageous features of this intermediate support element:
  opposite the third wall, the breakable protuberance has a fourth wall which the frangible zone connects to said body and which rigidly connects the front wall and the rear wall to each other;
  the frangible zone surrounds the breakable protuberance;
  the frangible zone is a thinned zone having a thickness which may be different between two regions of this thinned zone and which is in particular less than the body and the front wall, the rear wall and the third wall of the protuberance;
  the third wall of the protuberance is drilled with a hole for the passage of means for fixing the fender to the protuberance;
  the body has an upper wall which is provided with the protuberance, at least one upper oblique release ramp on the side of an edge of the front fender fitted to the upper wall and, at its lowest point, reaching a side edge of this upper wall;
  it is molded in a thermosetting polymer;
  the thermosetting polymer is filled with fibers and non-filiform particles generally called fillers;
  it contains between 25 and 40% by weight of thermosetting polymer, between 18 and 25% by weight of glass fibers and between 40 and 50% by weight of non-filiform particles.

A thermosetting polymer is advantageous for molding an intermediate support element according to the invention on account of:
  its ability to break under a brief impact;
  its static mechanical properties, and in particular its static stiffness which should be such that it should be possible to apply a force of 15 to 30 DaN progressively to the protuberance, in the region of the point where the fender is fixed, without this protuberance being displaced by more than 1 mm;
  its temperature resistance, by virtue of which the intermediate support element can undergo electrophoretic treatment at the same time as the chassis without deterioration, and can therefore be mounted on this chassis with fittings, that is to say before treatment by electrophoresis;
  its low shrinkage when molded and its linear coefficient of expansion close to that of steel, by virtue of which the intermediate support element can serve as a reference for positioning one or more front pieces of equipment such as a lighting assembly, the front facade and/or the hood of the vehicle, when these elements are mounted, and may also be optionally used for subsequently maintaining this positioning during the normal use of the vehicle,
  its capacity to flow only slightly with time when it is clamped for example by fixing means. This capacity makes it possible to fix the intermediate support element without a metal strut.

According to yet other advantageous features of the support element according to the invention:
  the thermosetting polymer is electrically conductive, so as to make it possible to paint, by electrostatic coating, a front fender mounted by means of the support element on a chassis of a motor vehicle;
  it has means for positioning at least one front piece of equipment of the motor vehicle, such as a lighting assembly, a front facade or a hood.

Advantageously, in section along any antero-posterior vertical plane, the protuberance is inside a first enveloping circle which has its center in the middle of a front portion of the frangible zone, in front of the protuberance, and passes through the middle of a rear portion of the frangible zone, behind the protuberance. Thus, when an impact occurs, the protuberance traverses the body without coming up against this, even in the case where the rear portion of the frangible zone breaks first, on account of an inclination of the impact with respect to the vertical, and where the protuberance then tilts about the front part of the frangible zone.

Advantageously, in section along any vertical antero-posterior plane, the protuberance is inside a second enveloping circle which has its center in the middle of the rear portion of the frangible zone, and passes through the middle of the front portion of the frangible zone. Thus, when an impact occurs, the protuberance traverses the body without coming up against this, even in the case where the front portion of the frangible zone breaks first.

Preferably, the frangible zone has a thickness of between 0.2 and 2.5 mm, a width of between 1 and 10 mm and an average length of between 200 and 230 mm. It is desirable for the frangible zone to be substantially subjected to shear during impact. The thickness of the frangible zone need not be constant around the protuberance, while remaining between 0.2 and 2.5 mm.

So that the frangible zone has the anticipated behavior during an impact, the tolerance on its thickness, that is to say the difference between its actual thickness after molding and a predetermined thickness, should be as small as possible, and in particular between +0.15 mm and −0.15 mm. The conventional compression molding method does not enable such a tolerance to be achieved in a reliable and repeatable manner. Moreover, the conventional injection molding method cannot be employed to manufacture the intermediate support element on account of the fact that the thickness of the frangible zone is too small. If it was molded in this way, local heating and therefore prepolymerization would take place in the region of the frangible zone during injection of material into the mold, which would result in a degradation of the mechanical properties of the intermediate support element.

In order to overcome these disadvantages, the subject of the invention is also a method for molding an intermediate support element as defined above, in which a mold is used which comprises at least one fixed part and one movable part and which delimits a molding chamber and at least one discharge passage communicating with this molding chamber, the latter comprising at least one portion which corresponds to the thinned zone of the intermediate support element and which is located between the fixed part and the movable part of the mold, this method comprising steps in which:
  a) the molding chamber is provided with more molding paste than is necessary for molding the intermediate support element, and then
  b) the movable part of the mold is moved toward the fixed part of the mold so as to cause the molding paste to flow between these fixed and movable parts and to discharge a surplus of molding paste through the discharge passage, until the mold delimits, apart from shrinkage, the final form of the intermediate support element.

At the end of step b), the surplus paste in the mold escapes through the discharge passage and therefore does not prevent the fixed and movable parts of the mold from coming together until the frangible zones reach the predetermined thickness.

Advantageously, in step b), the movable part of the mold is moved in a direction substantially perpendicular to the thinned zone of the intermediate support element during molding.

The invention will be better understood on reading the following description, given solely as an example and made with reference to the appended drawings, in which.

Figure 1:
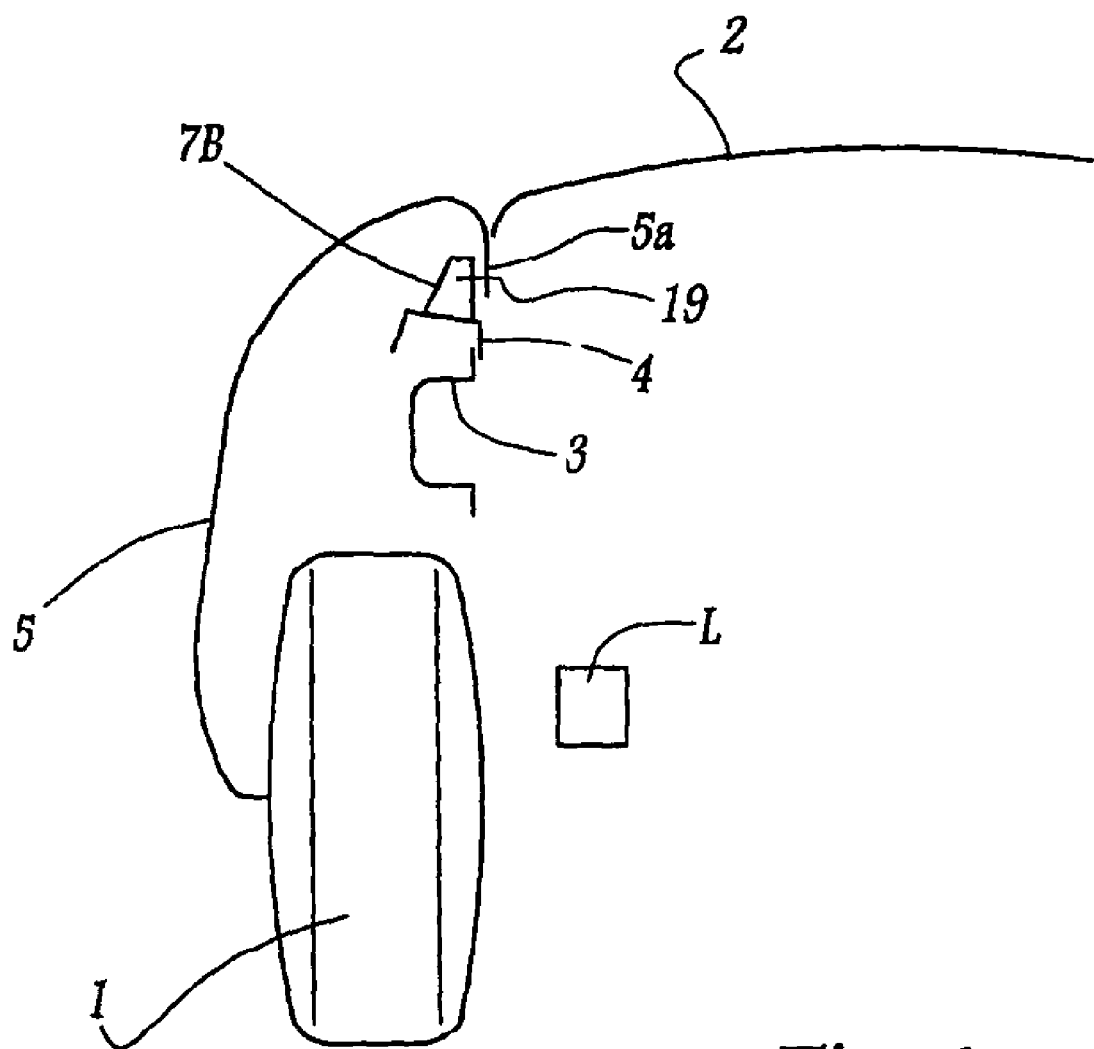
FIG. 1 is a simplified diagrammatic cross section of the front left hand portion of a motor vehicle of which each of the front fenders is supported by an intermediate element according to the invention.

A part of the body and chassis of a motor vehicle is shown diagrammatically in FIG. 1. This chassis and this body have a front right hand part which is symmetrical with their front left hand part which is not shown in FIG. 1 nor is described hereinafter.

In the present text and in the appended claims, the terms "front", "rear", "right" and "left" as well as similar terms refer to the normal direction of progression of the motor vehicle.

In FIG. 1, reference 1 and reference 2 denote respectively the front left hand wheel and the front hood of the motor vehicle, of which the chassis has a rail L and an upper left hand beam 3. An intermediate element 4 is mounted on the latter supporting the front left hand fender 5 of the body of the motor vehicle.

Figure 2:
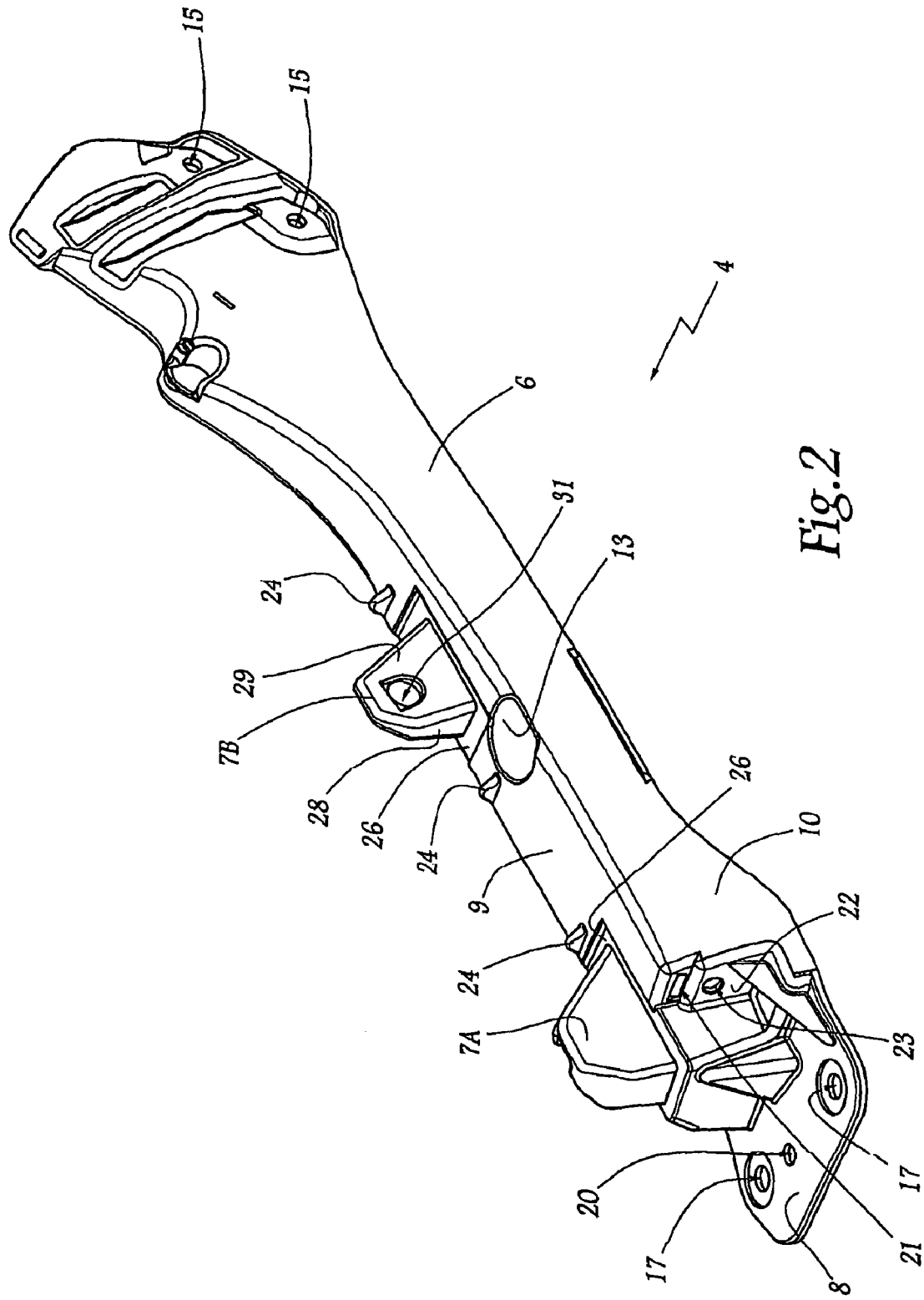
FIG. 2 is a perspective view of the intermediate element which supports the front left hand fender of the vehicle partially shown in FIG. 1.
Figure 3:
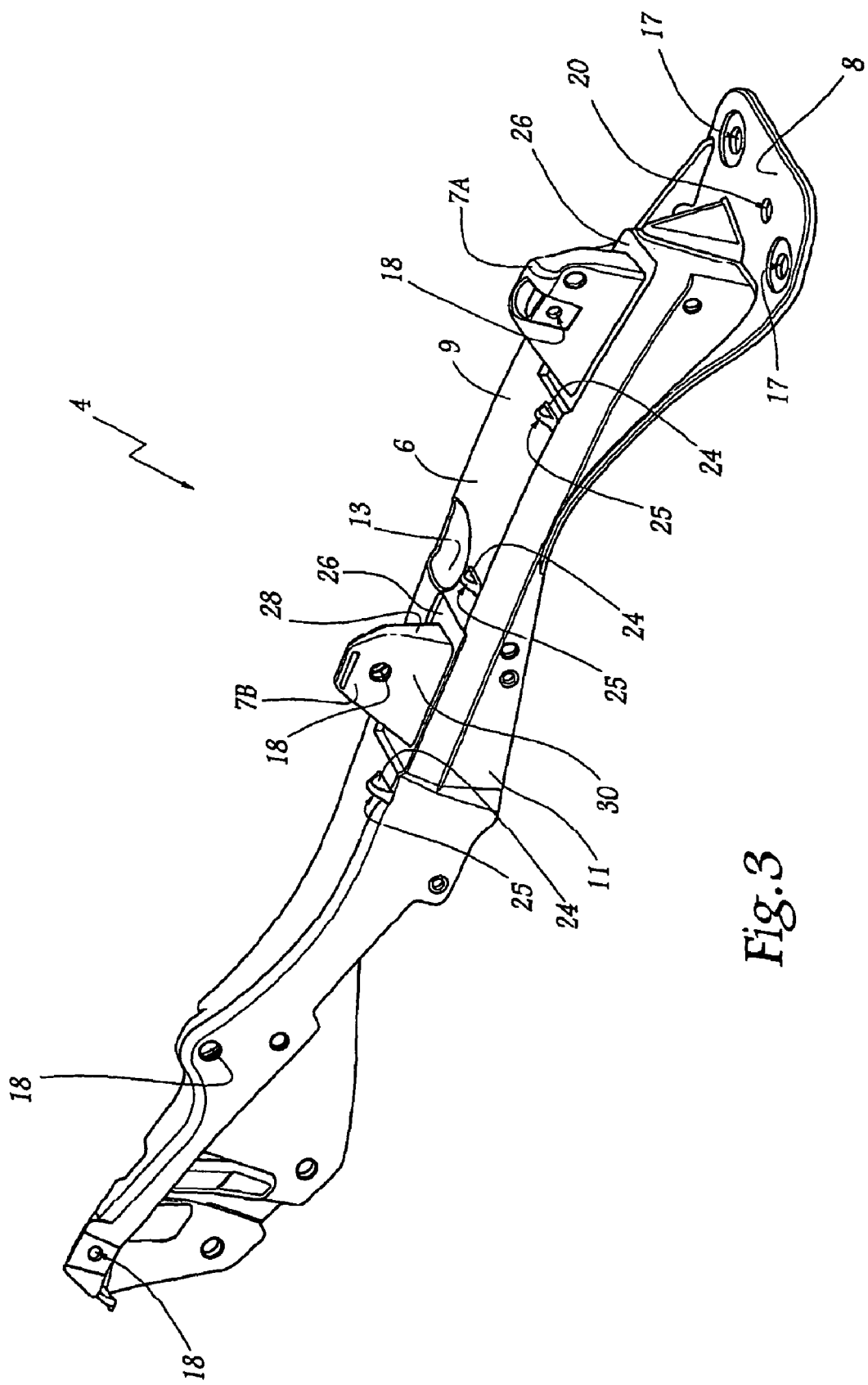
FIG. 3 is another perspective view of the intermediate support element shown in FIG. 2.
Figure 4:
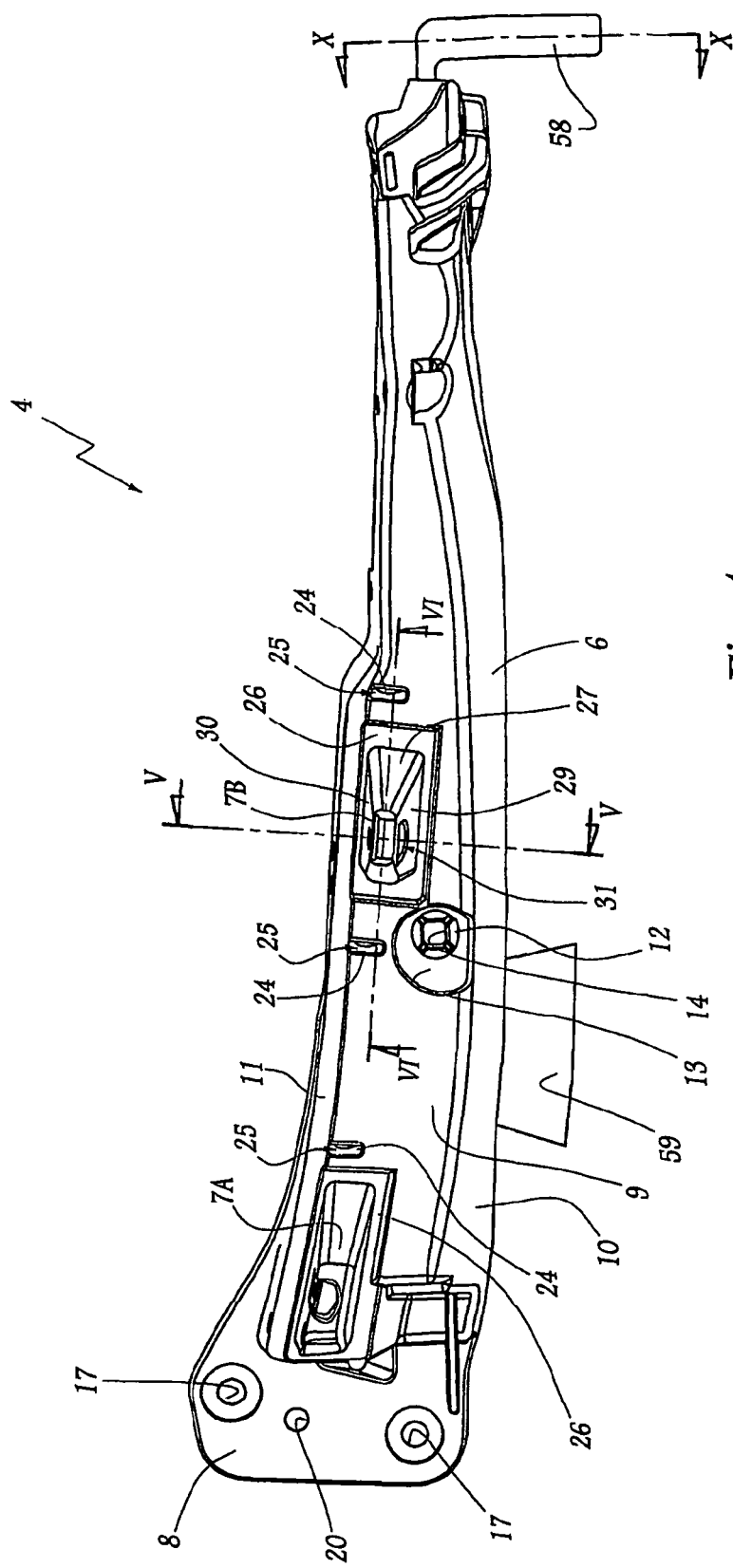
FIG. 4 is a view from above of the intermediate support element of FIGS. 2 and 3 from which the sprue coming from its molding has not yet been removed.

This element 4, according to the invention, is only shown in FIGS. 2 to 4. It comprises an elongated body 6, which is provided with upper breakable protuberances 7A and 7B, that are two in number in the example shown. Once the element 4 has been installed, this body 6 extends along the upper beam 3 and substantially above this beam 3.

This body 6, extended forward by a mounting base 8, comprises three longitudinal walls, namely an upper wall 9 and two side walls, one being a left hand wall referenced 10 and the other a right hand one referenced 11, which descends from the two lateral edges of the upper wall 9.

Away from these two ends, the body 6 comprises a mounting base 12, which is visible in FIG. 4 and which a hollow portion 13 connects rigidly to the upper wall 9 of the body 6. The base 12 is drilled with a hole 14 for the passage of means (not shown) for fixing the element 4 to the upper beam 3.

In the region of the rear end of the body 6, two holes 15 are drilled in the left hand wall 10 for the passage of means (not shown) for fixing the element 4 to the upper beam 3.

The front mounting base 8 is drilled with two holes 17 for the passage of means (not shown) for fixing the support element 4 onto the upper beam 3.

Figure 6A:
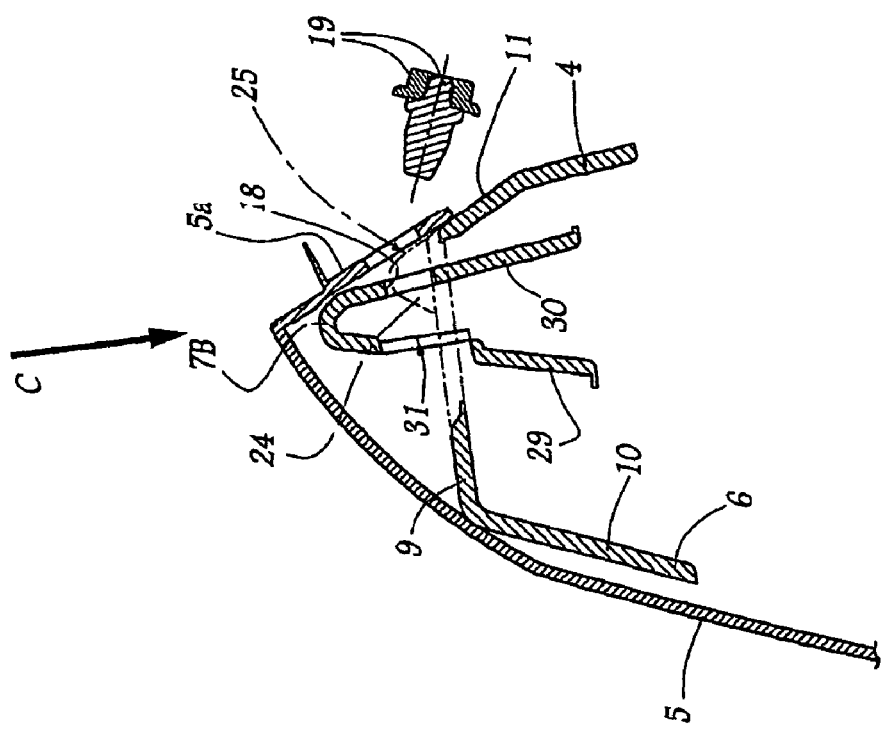
FIG. 6A is a section similar to FIG. 6 and illustrates the behavior of the intermediate support element of FIGS. 2 to 5 in the case of an impact.
Figure 6:
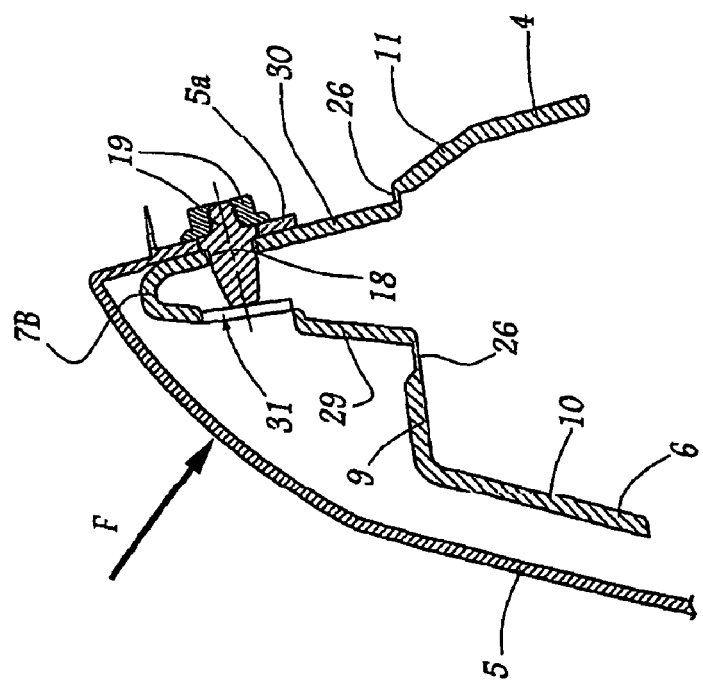
FIG. 6 is a diagrammatic section along the line VI-VI drawn in FIG. 4 and shows a portion of the front left hand fender of the vehicle, apart from the intermediate support element shown in FIGS. 2 to 5.

The front fender 5 is fixed to the support element 4 at four points that are distributed along this support element 4 and in the region of each of which a hole 18 is provided for the passage of fixing means, some of which are shown diagrammatically and referenced 19 in FIG. 6. Among these fixing points, the two that are most to the rear are situated in the region of the body 6. Each of the other two points for fixing the front fender 5 onto the support element 4 are situated in the region of one of the breakable protuberances 7A and 7B, which are offset longitudinally in relation to each other. It should be noted that the breakable protuberance 7A is located in the region of the front end of the body 6, close to the front mounting base 8, while the breakable protuberance 7B is situated close to the mounting base 12, namely away from the front and rear ends of the body 6.

A hole 20 for positioning the front facade (not shown) of the motor vehicle is drilled in the mounting base 8. The rim of this hole 20 is designed to cooperate with a complementary stud fitted to this front facade, in order to define the final position thereof.

Similarly, a slot 21 and a hole 23 enable the front left hand lighting assembly or front left hand head lamp insert (not shown) to be positioned and held in position until fixed in a front wall 22 carried by the body 6 and which connects the upper wall 9 to the mounting base 8. The rim of the hole 23 is designed to cooperate with a complementary component of the front left hand lighting assembly, in order to define the final position thereof. The slot 21 makes it possible to assemble this lighting assembly to the element 4 by clipping.

With a similar aim in mind, it should be noted that the front fender 5 is mounted on the support element 4 without the possibility of adjusting its position, which is in fact determined by that of this support element 4.

The upper wall 9 carries three upper ribs 24 which are offset longitudinally to each other and adjoin the junction zone of the right hand wall 11 and the upper wall 9 of the body 6. Each rib 24 defines an upper oblique release ramp 25 which, at its lowest point, is flush with the right hand wall 11 of the body 6.

The protuberances 7A and 7B are carried by the upper wall 9 and project upward. They adjoin the right hand wall 11 which, of the two walls 10 and 11, is the one situated furthest inside the motor vehicle. A frangible zone 26 connects each of these to the body 6.

As the breakable protuberances 7A and 7B are in the main similar, only the one referenced 7B is described hereinafter and is shown in section in FIGS. 5 and 6.

The protuberance 7B has four peripheral walls facing each other in pairs, namely a rear wall 27, a front wall 28, a left hand wall 29 and a right hand wall 30. The left hand wall 29 rigidly connects the rear wall 27 to the front wall 28. The same applies to the right hand wall 30. As it surrounds the protuberance 7B, the corresponding frangible zone 26 connects each of the walls 27, 28, 29 and 30 to the body 6.

The hole 18 provided in the region of the protuberance 7B is drilled in the right hand wall 30, which is only slightly offset laterally from the right hand wall 11 of the body 6 and which, of the two walls 29 and 30, is the one situated furthest inside the motor vehicle. Another hole 31 is provided in the protuberance 7B and provides access to the interior of this protuberance so as to be able, as required, to manipulate the fixing means 19. The latter are themselves known and are used conventionally for fixing body elements.

The presence of the left hand wall 29 and the right hand wall 30, complementary to the rear wall 27 and the front wall 28, make it easier to mold the protuberance 7B. Moreover, the frangible zone 26 already connecting the rear wall 27 and the front wall 28 to the body 6 can also connect the left hand wall 29 and/or the right hand wall 30 to this same body 6, which increases the ability of the frangible zone 26 not to give when the protuberance 7B is subjected to a static force having a transverse component. Such a static force, symbolized by the arrow F in FIG. 6, can for example result from supporting a person seated on the front fender 5.

Figure 5:
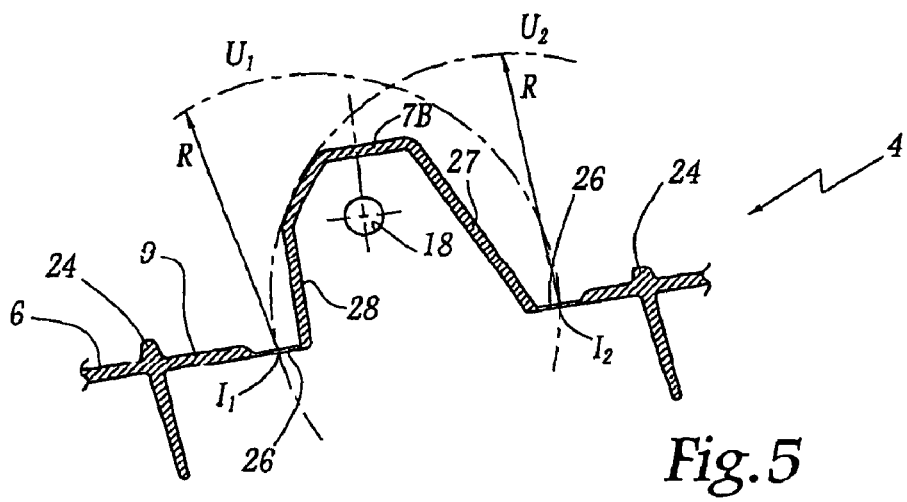
FIG. 5 is a partial diagrammatic section along the line V-V of FIG. 4.
Figure 7:
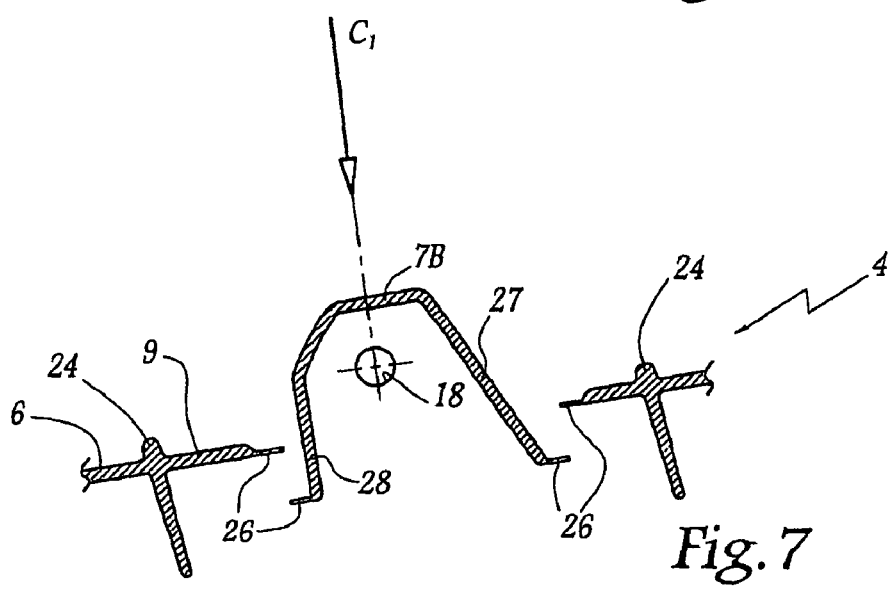
FIG. 7 is a section similar to FIG. 5 and illustrates a first behavior of the intermediate support element of FIGS. 2 to 6 in the case of an impact.
Figure 8:
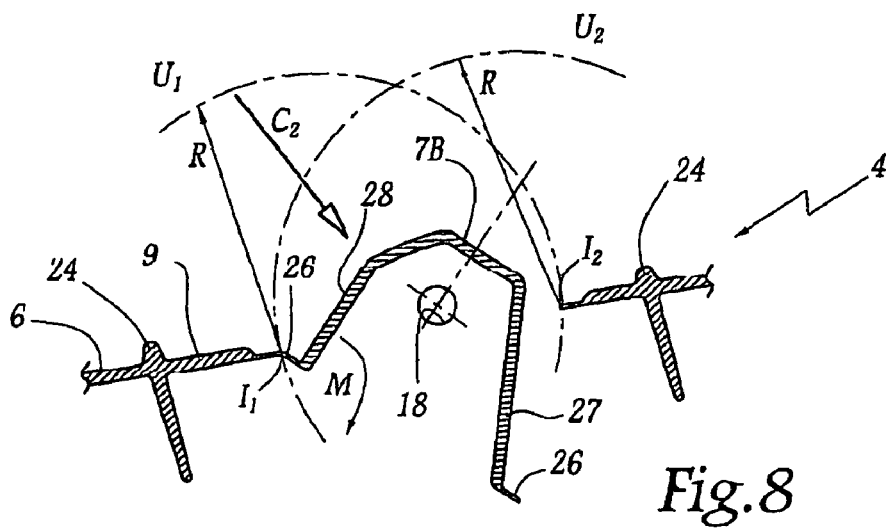
FIG. 8 is a section similar to FIG. 5 and illustrates a second behavior of the intermediate support element of FIGS. 2 to 6 in the case of an impact.

In section along any antero-posterior vertical plane such as the plane in section of FIGS. 5, 7 and 8, the protuberance 7B is inscribed in two enveloping circles $U_1$ and $U_2$ visible in FIGS. 5 and 8. The center $I_1$ of the circle $U_1$ and the center $I_2$ of the circle $U_2$ are situated respectively in the middle of the front portion of the frangible zone 26 and in the middle of the rear portion of this frangible zone 26. The circle $U_1$ passes through $I_2$ while the circle $U_2$ passes through $I_1$. In other words, the circles $U_1$ and $U_2$ have the same radius R equal to the distance between $I_1$ and $I_2$.

The frangible zone 26 is a thinned zone that is thinner than the body 6 and the protuberance 7B. More precisely, the thickness of the frangible zone 26 is advantageously between 0.2 and 2.5 mm. Thicknesses of about 0.9 mm for the frangible zone 26, of about 3 mm for the protuberance 7B and about 3.5 mm for the body 6 have given very satisfactory results.

The thickness of the frangible zone 26 need not be constant. In particular, it may be greater or smaller according to whether it is measured in front, behind, to the right or to the left of the protuberance 7B. Variations in the thickness of the frangible zone 26 around the protuberance 7B may in particular be configured so as to increase the ability of this frangible zone not to give in the case where a static force is applied of the type referenced F in FIG. 6.

The support element 4 is molded in a thermosetting polymer filled with chopped reinforcing fibers, for example glass fibers, and of non-filiform particles or fillers, such as mineral particles. Very satisfactory results have been obtained when the thermosetting polymer is a polyester. The proportion of thermosetting polymer in the composite material of which the support element 4 is made is advantageously between 25 and 40% by weight. The proportion of glass fibers in the composite material of which the supporting element 4 is made is advantageously between 18 and 25% by weight. The proportion of non-filiform particles in the composite material of which the support element is made is advantageously between 40 and 50% by weight.

The reinforcing fibers have an average length advantageously between 10 and 30 mm.

When defined as above, the composite material of which the support element 4 is made proves to be very satisfactory in at least three respects. Firstly, it withstands temperatures that can reach 2102° C. without deterioration, so that it is possible to treat, by electrophoresis, a chassis already provided with a support element 4.

Secondly, by employing this composite material, the elements 4 can be manufactured with a very small dimensional tolerance, so that once mounted, the support element 4 can act as a reference for positioning the front hood of the motor vehicle, the front facade of the motor vehicle, the left hand lighting assembly of the motor vehicle and the front left hand fender 5 of the motor vehicle.

Thirdly, by virtue of this composite material, the frangible zones 26, that are more precisely breakable, have the desired behavior in case of rupture. In particular, if this rupture takes place, it is brief in comparison with the case where the support element 4 would be molded in a thermoplastic polymer. Now, it is known that the human cranium is able to withstand brief impacts, but that it is damaged by long impacts.

Advantageously, the material of which the support element 4 is made contains carbon particles in a quantity such that this element 4 is electrically conductive, so that, even when mounted on the chassis with the interposition of the support element 4, the front fender 5 can be painted by electrostatic coating.

When the support element 4 is mounted on the upper beam 3, the protuberances 7A and 7B are above an empty space that is higher than they are and which separates them from the upper beam 3. This results from the fact that the mounting bases 8 and 12 are offset at least downward, by a height greater than that of the protuberances 7A and 7B from the upper wall 9 which carries these protuberances 7A and 7B.

When, after having been struck in the region of the legs by the motor vehicle, a pedestrian collides with the front fender 5, at least one of the frangible zones 26 gives, if the impact is sufficiently large, and the corresponding breakable protuberance 7A or 7B then passes across the upper wall 9 of the body 6. When this occurs, the ramps 25 deflect, if necessary, the edge 5a of the fender 5 on the right hand side of the support element 4, as can be seen in FIG. 6A where a rib 24 and the portion of the wall 9 carrying this rib 24 have been added as a dot and dash line and where the arrow C symbolizes an impact.

By absorbing part of the energy of the impact between the pedestrian and the front fender 5, rupture of the frangible zone or zones 26 dampens this impact, which tends to reduce the risk of injury to the pedestrian and, if injuries occur, the severity of these injuries. A first and a second type of impact should more particularly be envisaged. Impacts of the first type, an example of which is symbolized by the arrow $C_1$ in FIG. 7, are substantially perpendicular to the upper portion of the front fender 5. When the impact $C_1$ takes place, the front portion and the rear portion of the frangible zone 26 surrounding the protuberance 7B break substantially at the same time, which leads to the situation illustrated in FIG. 7.

Impacts of the second type, an example of which is symbolized by the arrow $C_2$ in FIG. 8, are oblique in relation to the upper portion of the front fender 5. When the impact $C_2$ takes place, the rear portion of the frangible zone 26 surrounding the protuberance 7B breaks first of all, so that this protuberance tilts around the front portion of the frangible zone 26, symbolized by the arrow M drawn in FIG. 8. As the protuberance 7B is inside the circle $U_1$, the protuberance 7B is not suddenly stopped by the body 6 when it tilts in this way. The same occurs if the impact is such that the front portion of the frangible zone 26 surrounding the protuberance 7B breaks first of all, since this protuberance 7B is inside the circle $U_2$.

The behavior of the protuberance 7A in the case of an impact is of course similar to that of the protuberance 7B, which has just been described.

The preceding account means that the impacts C1 and C2 are applied to the front fender 5 or to the front hood 2, since the latter rests on the front fenders of the motor vehicle.

Impacts of the first type and those of the second type are in the main descending impacts applied to the top of the hood 2 and/or one of the front fenders 5 of the motor vehicle. The frangible zones 26 and the protuberances 7A and 7B therefore form dampers for such impacts, which can in particular be impacts to the head.

In this respect, it should be noted that, when a pedestrian is struck in the region of the legs by a motor vehicle, he or she is generally knocked over onto the hood 2 and/or onto one of the front fenders of the motor vehicle, in which case his or her head very often collides with the top of this hood and/or of one these fenders.

The element 4 is molded with the aid of the mold 50 which is shown in FIGS. 9 to 12 and which comprises an upper vertically movable part 51 and a lower fixed part 52. This upper part 51 and this lower part 52 of the mold 50 are carried respectively by the movable part and the fixed part of a vertical press (not shown). They delimit conjointly a molding chamber 53 into which an injection channel emerges which is not shown in FIGS. 9 to 12. It also delimits a discharge passage 54 which communicates with the molding chamber 53 and which can be seen in FIGS. 10 and 12.

Figure 9:
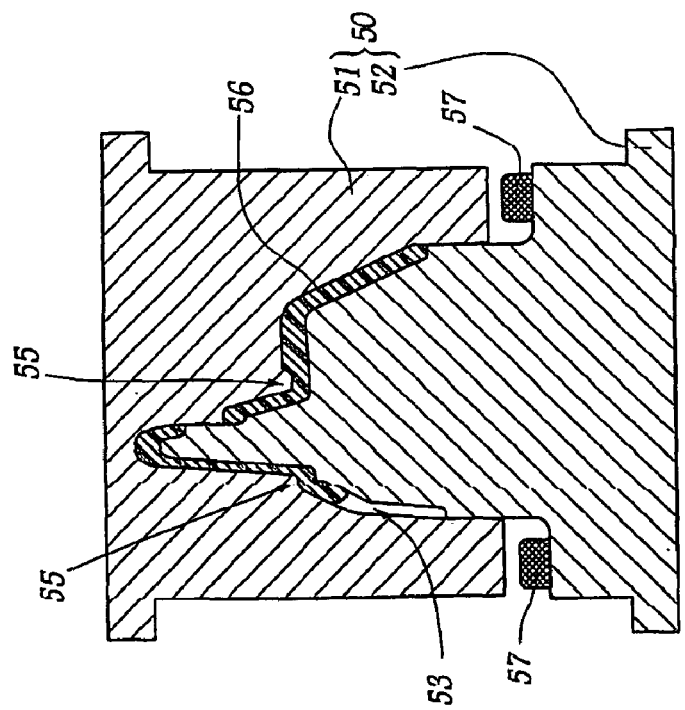
FIG. 9 is a section of a mold along a line corresponding to the line V-V of FIG. 4 and illustrates a step of a method, according to the invention, for molding the support element shown in particular in FIGS. 2 to 5.
Figure 11:
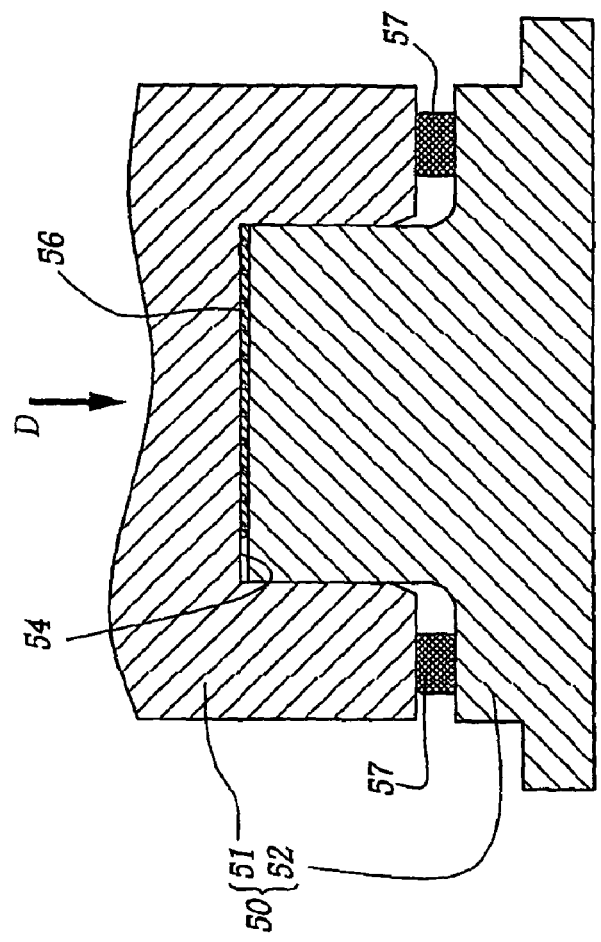
FIG. 11 is a section similar to FIG. 9 and illustrates another step of the molding method.
Figure 12:
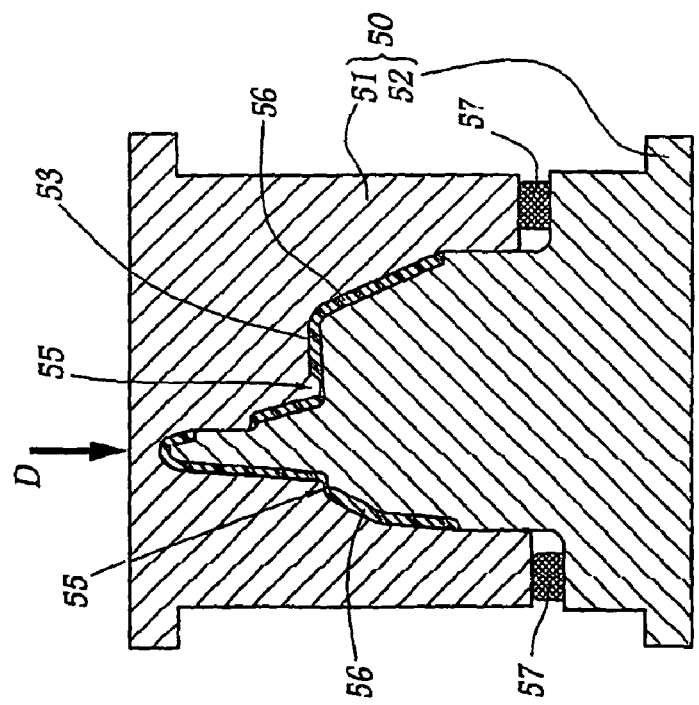
FIG. 12 is a partial section similar to FIG. 10 and illustrates the same step of the molding method as FIG. 11.

In FIGS. 9 and 11, the portions of the chamber 54 are referenced 55 and correspond to the frangible zones 26. They are situated between the fixed part 52 and the movable part 51 of the mold 50.

Figure 10:
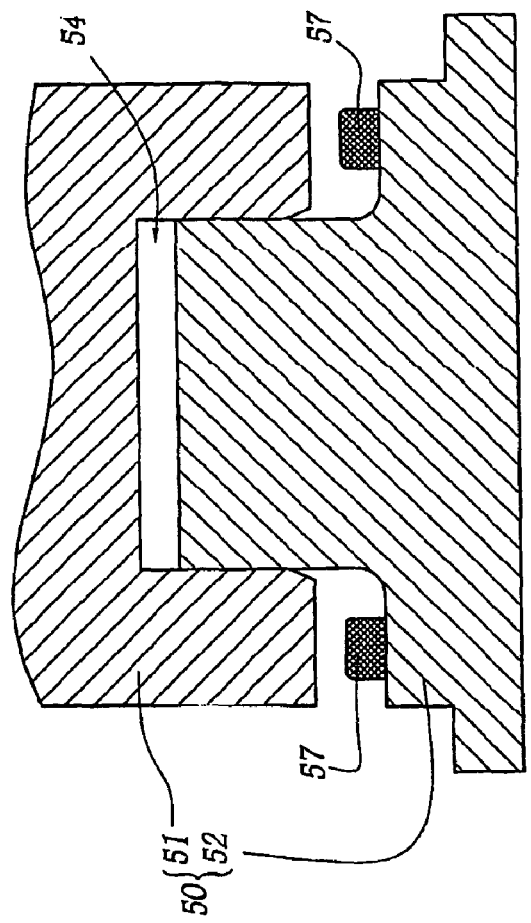
FIG. 10 is a partial section of the mold of FIG. 9 along a line corresponding to the line X-X of FIG. 4 and illustrates the same step of the molding method as FIG. 9.

In order to manufacture the element 4, the mold 50 is first of all partially closed, after which it is as illustrated in FIGS. 9 and 10. A quantity of molding paste 56 which is greater than that necessary to mold the element 4 is then injected into the molding chamber 53. The molding paste 56 is then distributed inside the major part of the molding chamber 53, since the mold is partially closed. In other words, folllowing injection of the molding paste 56, the element 4 is already partially molded.

Once injection of the molding paste 56 has been completed, the movable part 51 is moved in the direction of the arrow D, namely toward the fixed part 52, so that the molding paste 56 flows between these fixed and movable parts 52 and 51 and completely fills the molding chamber 53. Vertical movement of the movable part 51 of the mold 50 is substantially perpendicular to the frangible zones 26. When this movement occurs, molding paste 56 escapes from the portions 55 which become progressively thinner. The surplus molding paste 56 in the mold 50 escapes through the discharge passage 54 and therefore does not prevent the parts 51 and 52 of the mold 50 from coming together until the frangible zones 26 reach the desired thickness. This surplus paste will form the sprue shown and referenced 58 in FIG. 4.

The movable part 51 is stopped when it comes up against the supporting wedges 57 fitted to the fixed part 52 of the mold 50. The mold 50 then delimits, apart from shrinkage, the final form of the element 4. The paste 56 is then polymerized by curing.

After the element 4 has been demolded, the sprue 58 is removed from it as well as sprue 59 that has formed in the injection channel and which is shown in FIG. 4.

The invention is not limited to the embodiment described previously. In particular, the frangible zone 26 may be made more brittle in some places, in particular at its four corners, so that breakage starts in the region of these places. Embrittlement of the frangible zone 26 may, for example, be made by holes or by localized thinning.

Moreover, each of the walls 29 and 30 may be partly or completely removed or replaced by a thin web which, since it is not rigid, has the function of making it easier to mold the protuberance of which it forms part.

In addition, the molding paste 56 need not be injected into the partially closed mold 50, but may be deposited in this mold when open.

The invention claimed is:

1. An intermediate support element for a front fender of a motor vehicle, the support element being able to be mounted on an upper beam of a chassis of the motor vehicle, the support element comprising:
   a body; and
   at least one breakable protuberance projecting upward and to which said front fender is intended to be fixed, said protuberance and said body being molded in a single part, said protuberance comprising:
- at least one front wall connected to the body by a frangible zone situated at a foot of the protuberance,
- a rear wall connected by the frangible zone to said body, and
- a third wall connected by the frangible zone to said body, wherein:

the third wall rigidly connects the front wall and the rear wall to each other, and the frangible zone is a thinned zone having a thickness that is less than said body and said front wall, said rear wall and said third wall of the protuberance, the frangible zone being configured to break when the support element is subjected to a substantially vertical force directed downwards and corresponding to an impact with a pedestrian.

2. The intermediate support element as claimed in claim 1, wherein opposite the third wall, the breakable protuberance has a fourth wall, the frangible zone connects said fourth wall to said body and the fourth wall rigidly connects the front wall and the rear wall to each other.

3. The intermediate support element as claimed in claim 2, wherein the frangible zone surrounds the breakable protuberance.

4. The intermediate support element as claimed in claim 1, wherein the third wall of the protuberance is drilled with a hole for the passage of a fixing device that fixes the fender to the protuberance.

5. The intermediate support element as claimed in claim 1, wherein said body has an upper wall that is provided with the protuberance, and at least one upper oblique release ramp on a side of an edge of the front fender fitted to the upper wall and, at a lowest point, reaching a side edge of the upper wall.

6. The intermediate support element as claimed in claim 1, wherein the support element is molded in a thermosetting polymer.

7. The intermediate support element as claimed in claim 6, wherein the thermosetting polymer is filled with fibers and non-filiform particles.

8. The intermediate support element as claimed in claim 7, wherein the support element contains between 25 and 40% by weight of thermosetting polymer, between 18 and 25% by weight of glass fibers and between 40 and 50% by weight of non-filiform particles.

9. The intermediate support element as claimed in claim 6, wherein the thermosetting polymer is electrically conductive.

10. The intermediate support element as claimed claim 1, further comprising positioning structure that positions at least one front piece of equipment of the motor vehicle.

11. The intermediate support element as claimed in claim 1, wherein, in section along any antero-posterior vertical plane, the protuberance is inside a first enveloping circle which has a center in a middle of a front portion of the frangible zone, in front of the protuberance, and passes through the middle of a rear portion of the frangible zone, behind the protuberance, and in that in section along any antero-posterior vertical plane, the protuberance is inside a second enveloping circle which has a center in a middle of the rear portion of the frangible zone, and passes through the middle of the front portion of the frangible zone.

12. A method for molding the intermediate support element as claimed in claim 1, in which a mold is used which comprises at least one fixed part and one movable part and which delimits a molding chamber and at least one discharge passage communicating with the molding chamber, the latter comprising at least one portion which corresponds to said thinned zone of the intermediate support element and which is located between the fixed part and the movable part of the mold, the method comprising steps in which:
- a) the molding chamber is provided with more molding paste than is necessary for molding the intermediate support element, and then
- b) the movable part of the mold is moved toward the fixed part of the mold so as to cause the molding paste to flow between the fixed and movable parts and to discharge a surplus of molding paste through the discharge passage, until the mold delimits, apart from shrinkage, the final form of the intermediate support element.

13. The method as claimed in claim 12, wherein in step b), the movable part of the mold is moved in a direction substantially perpendicular to said thinned zone of the intermediate support element during molding.

* * * * *